L. C. KNACKSTEDT.
SUPPORT FOR EYEGLASSES AND EYESHADES.
APPLICATION FILED MAY 3, 1921.
1,435,533.
Patented Nov. 14, 1922.
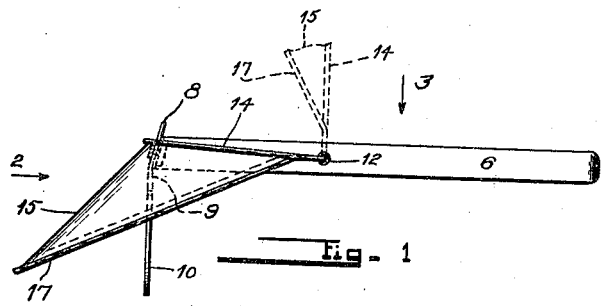
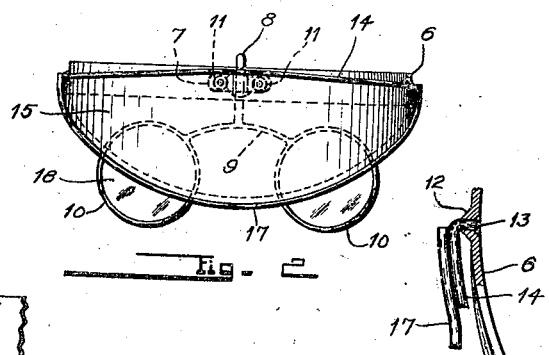
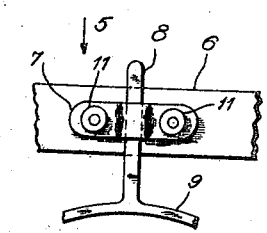
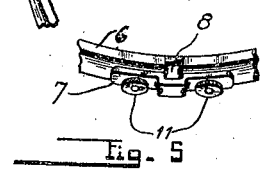
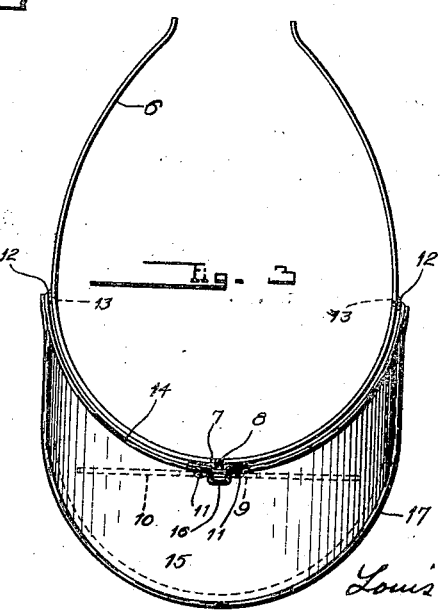
Inventor
Louis C. Knackstedt.
By John W. Darley
Attorney Patented Nov. 14, 1922.

1,435,533

UNITED STATES PATENT OFFICE.

LOUIS C. KNACKSTEDT, OF ANNAPOLIS, MARYLAND.

SUPPORT FOR EYEGLASSES AND EYESHADES.

Application filed May 3, 1921. Serial No. 466,422.

*To all whom it may concern:*

Be it known that I, LOUIS C. KNACKSTEDT, a citizen of the United States, residing at Annapolis, in the county of Anne Arundel and State of Maryland, have invented certain new and useful Improvements in Supports for Eyeglasses and Eyeshades; and I do hereby declare the following to be a full, clear, and exact description of the invention, such as will enable others skilled in the art to which it appertains to make and use the same.

My invention relates to a support for eye glasses and an eye shade.

Among the objects of my invention are:

To provide a support for eye glasses so that the eye glasses may be readily adjusted and held in place with a minimum of discomfort to the wearer.

To provide a support for eye glasses so that an eye shade may be detachably secured thereto.

In the drawings:

Figure 1 is a side view of my improved support showing the eye glasses and eye shade attached thereto.

Fig. 2 is a view of the parts shown in Fig. 1 looking in the direction of the arrow 2 in said figure.

Fig. 3 is a view of the parts shown in Fig. 1 looking in the direction of the arrow 3 in said figure.

Fig. 4 is an enlarged detail view showing the clamp for supporting the eye glasses when viewed in the direction of the arrow 2 in Fig. 1.

Fig. 5 is a view of the parts shown in Fig. 4 looking in the direction of the arrow 5 in said figure and, in addition, shows in enlarged detail and partly in section the manner in which the frame of the eye shade is connected to my improved support.

In the drawings:—

6 represents my improved support which is made of any approved material, but preferably resilient, and shaped to fit snugly around the head of the wearer.

A clamp 7 offset as shown in Fig. 5 to embrace the finger 8 which is secured to the cross bar 9 of the eye glass frame 10 is secured to the support 6 by screws 11—11.

At any approved location on the sides of the support 6 there are swedged conical shaped projections 12 provided with a hole in which are removably journalled the ends 13 of the top wire 14 of the frame supporting the eye shade 15. The wire 14 is offset as at 16 in order to clear the finger 8 and also to provide a hole for ventilation. The offset portion 16 normally rests upon the clamp 7 and supports the eye shade 15 in position. The bottom wire 17 is curved and has its ends joined to the top wire 14 as shown in the drawings. The eye shade 15 is composed of any approved material secured to the wires 14 and 17.

The manner of use of my improved eye shade is as follows:—

The support 6 having been fitted to and placed in a comfortable position upon the head of the wearer, the screws 11—11 are to be loosened and the finger 8 moved up and down, and the cross bar 9 adjusted until the eye glasses 18 are in correct position to suit the wearer. The ends 13 are then to be sprung into the holes in the projection 12 and the eye shade is ready for use.

Thus it will be evident that I provide a support which can be used for supporting eye glasses and an eye shade together, or either, alone. Furthermore, that my support does not produce any pressure upon the bridge of the nose or upon the temples, since it is preferably shaped so that the pressure comes upon the hair at the back of the head.

It is also to be noted that when desired the eye shade can be turned up over the forehead as shown dotted in Fig. 1, and thus provide an unobstructed field of vision for the user.

While I have shown one embodiment of my invention, it is evident that many changes may be made therein without departing from the spirit thereof.

I claim:—

As a new article of manufacture, combined eye glasses and eye-shade comprising a support shaped to fit the head and provided with a pair of bearing holes and a clamp, eye-glasses having a finger fixed thereto and slidably mounted in said clamp and an eyeshade having pintles revolubly and removably mounted in said bearing holes, said clamp serving as a stop for said shade to support it in its lowermost position.

In testimony whereof, I affix my signature.

LOUIS C. KNACKSTEDT.